US011859687B2

United States Patent
Ziegler et al.

(10) Patent No.: US 11,859,687 B2
(45) Date of Patent: Jan. 2, 2024

(54) MOTOR WITH SPRING-MOUNTED MOVABLE MOTOR PART AND PERSONAL CARE DEVICE COMPRISING SUCH A MOTOR

(71) Applicant: Braun GmbH, Kronberg (DE)

(72) Inventors: Frank Ziegler, Karben (DE); Thomas Meinke, Kelkheim (DE); Thomas Brum, Oberursel (DE); Kenji Ohi, Matsudo (JP); Takeshi Hotta, Matsudo (JP)

(73) Assignee: Braun GmbH, Kronberg (DE)

( * ) Notice: Subject to any disclaimer, the term of this patent is extended or adjusted under 35 U.S.C. 154(b) by 820 days.

(21) Appl. No.: 16/864,779

(22) Filed: May 1, 2020

(65) Prior Publication Data
US 2020/0347907 A1    Nov. 5, 2020

(30) Foreign Application Priority Data

May 2, 2019 (EP) ..................... 19172247

(51) Int. Cl.
*F16F 15/073* (2006.01)
*A61C 17/34* (2006.01)
(Continued)

(52) U.S. Cl.
CPC ............ *F16F 15/073* (2013.01); *A61C 17/34* (2013.01); *F16F 1/185* (2013.01); *H02K 7/14* (2013.01);
(Continued)

(58) Field of Classification Search
CPC .......... F16F 15/073; F16F 1/185; F16F 1/027; F16F 2234/06; F16F 2236/022;
(Continued)

(56) References Cited

U.S. PATENT DOCUMENTS 4,541,034 A     9/1985   Fanning
5,393,956 A *   2/1995   Guth ..................... B23K 26/26
                                                    219/121.64
(Continued)

FOREIGN PATENT DOCUMENTS

CN    101511301 A    8/2009
CN    101553975 A    10/2009
(Continued)

OTHER PUBLICATIONS

English translation of DE-102017118089-A1 (Year: 2019).*
(Continued)

*Primary Examiner* — Tulsidas C Patel
*Assistant Examiner* — Joshua Kiel M Rodriguez
(74) *Attorney, Agent, or Firm* — Gregory S. Darley-Emerson (57) ABSTRACT

A motor and a personal-care device having the motor. The motor has a motor carrier made at least partially from a sheet metal material, a movable motor part, and a spring element that couples the movable motor part with the motor carrier. The sheet metal material comprises at least one coupling area where the sheet metal material is folded so that its two layers are facing each other while each of the two layers comprises a slot, the slots being aligned with one another. A connection extension of the spring element extends through the aligned slots.

22 Claims, 5 Drawing Sheets

(51) Int. Cl.
*F16F 1/18* (2006.01)
*H02K 7/14* (2006.01)
*H02K 33/06* (2006.01)
*F16F 1/02* (2006.01)

(52) U.S. Cl.
CPC .............. *H02K 33/06* (2013.01); *F16F 1/027* (2013.01); *H02K 7/145* (2013.01)

(58) Field of Classification Search
CPC ....... F16F 2238/022; F16F 1/26; A61C 17/34; A61C 17/16; A61C 17/222; H02K 7/14; H02K 33/06; H02K 7/145; A45D 26/0038; A45D 26/0052; A45D 26/00; A45D 26/0076
See application file for complete search history.

(56) References Cited

U.S. PATENT DOCUMENTS

| | | |
|---|---|---|
| 2003/0236026 A1 | 12/2003 | Endo |
| 2009/0136285 A1* | 5/2009 | Hall ................. A61C 17/28 401/282 |
| 2010/0066180 A1* | 3/2010 | Ries .................. H02K 1/28 310/15 |
| 2010/0066182 A1 | 3/2010 | Yamazaki |
| 2011/0289699 A1 | 12/2011 | Schaefer |
| 2011/0314677 A1 | 12/2011 | Meier |
| 2012/0227269 A1 | 9/2012 | Subramanian et al. |
| 2014/0015346 A1 | 1/2014 | Schober |
| 2015/0123504 A1* | 5/2015 | Mili ................ H02K 11/026 310/72 |
| 2015/0198215 A1 | 7/2015 | Koyama |
| 2016/0046028 A1 | 2/2016 | Meier et al. |
| 2017/0079421 A1 | 3/2017 | Tamminga |
| 2017/0288519 A1* | 10/2017 | Kim ................. H02K 33/00 |
| 2018/0019650 A1 | 1/2018 | Schober |
| 2018/0087631 A1 | 3/2018 | Kramp |
| 2019/0125067 A1 | 5/2019 | Schaefer |

FOREIGN PATENT DOCUMENTS

| | | | | |
|---|---|---|---|---|
| CN | 102111032 A | * | 6/2011 | ............. H02K 33/00 |
| CN | 104471848 A | | 3/2015 | |
| CN | 104994798 A | | 10/2015 | |
| CN | 106001894 A | | 10/2016 | |
| CN | 206675607 U | | 11/2017 | |
| CN | 207117451 U | | 3/2018 | |
| CN | 207202958 U | | 4/2018 | |
| CN | 207286167 U | | 5/2018 | |
| DE | 102017118089 A1 | * | 2/2019 | ............. B29C 70/46 |
| EP | 2676569 A1 | | 12/2013 | |
| EP | 2790309 | | 10/2014 | |
| JP | S60229644 A | | 11/1985 | |
| JP | H09107665 A | | 4/1997 | |
| JP | H09172763 A | | 6/1997 | |
| JP | H10174338 A | | 6/1998 | |
| KR | 1321729 B1 | * | 10/2013 | ............... B06B 1/14 |
| WO | 2010067753 A1 | | 6/2010 | |
| WO | 2013005688 A1 | | 1/2013 | |
| WO | 2015104980 A1 | | 7/2015 | |
| WO | 2015159162 A1 | | 10/2015 | |
| WO | WO-2016207704 A1 | * | 12/2016 | ............. F16F 15/073 |
| WO | WO2019130705 | | 7/2019 | |
| WO | 2020222184 A1 | | 11/2020 | |
| WO | 2020259758 A1 | | 12/2020 | |
| WO | 2022118660 A1 | | 6/2022 | |
| WO | 2022234903 A1 | | 11/2022 | |

OTHER PUBLICATIONS

English translation of KR-1321729-B1 (Year: 2013).*
Extended European Search Report and Search Opinion; Application Ser. No. 19172247.9; dated Oct. 15, 2019; 5 pages.
International Search Report and Written Opinion; Application Ser. No. PCT/IB2020/054133; dated May 28, 2020; 13 pages.

* cited by examiner

MOTOR WITH SPRING-MOUNTED MOVABLE MOTOR PART AND PERSONAL CARE DEVICE COMPRISING SUCH A MOTOR

FIELD OF THE INVENTION

The present application is concerned with a motor that has a spring-mounted movable motor part, in particular where the spring element is connected with a motor carrier. The present application is also concerned with a personal care device comprising such a motor.

BACKGROUND OF THE INVENTION

It is known that motors, e.g. for use in an electric toothbrush, have one or several moving motor parts that are mounted at a motor carrier by means of one or several spring elements. Document WO 2014/009915 A2 generally discusses such a motor.

It is now an objective of the present disclosure to provide a motor that has an improved structure, in particular improved with respect to simplification of the motor structure and of the manufacturing process.

SUMMARY OF THE INVENTION

In accordance with one aspect, a motor is provided that has a motor carrier made at least partially from a sheet metal material, a movable motor part, a spring element that couples the movable motor part with the motor carrier, wherein the sheet metal material comprises at least one coupling area where the sheet metal material is folded so that two layers of sheet metal material are arranged vis-à-vis to each other and each of the two layers comprises a slot, which slots are aligned with each other and through which aligned slots a connection extension of the spring element extends.

In accordance with one aspect, a personal care device is provided that comprises a motor as proposed.

BRIEF DESCRIPTION OF THE DRAWINGS

The present disclosure is further elucidated by a detailed description of example embodiments and with reference to figures. In the figures

DETAILED DESCRIPTION OF THE INVENTION

In the context of the present description "personal care" shall mean the nurture (or care) of the skin and of its adnexa (i.e. hairs and nails) and of the teeth and the oral cavity (including the tongue, the gums etc.), where the aim is on the one hand the prevention of illnesses and the maintenance and strengthening of health ("care") and on the other hand the cosmetic treatment and improvement of the appearance of the skin and its adnexa. It shall include the maintenance and strengthening of wellbeing. This includes skin care, hair care, and oral care as well as nail care. This further includes other grooming activities such as beard care, shaving, and depilation. A "personal care device" thus means any device for performing such nurturing or grooming activity, e.g. (cosmetic) skin treatment devices such as skin massage devices or skin brushes; wet razors; electric shavers or trimmers; electric epilators; and oral care devices such as manual or electric toothbrushes, (electric) flossers, (electric) irrigators, (electric) tongue cleaners, or (electric) gum massagers. This shall not exclude that the proposed personal hygiene system may have a more pronounced benefit in one or several of these nurturing or device areas than in one or several other of these areas. In the below description with reference to the figures, an epilation device was chosen to present details of the proposed personal care device. To the extent in which the details are not particular to an epilation device, the proposed technology can be used in any other personal care device.

In accordance with the present disclosure, a moving motor part of a motor is coupled with a motor carrier by means of at least one spring element. The motor carrier is at least partially made from a sheet metal material and in particular the motor carrier may comprise a portion that is made from stamped and bent sheet metal. A sheet metal material used for the purpose of providing a mounting structure for a motor of a personal care device has a certain thickness that may be in a range of between 0.05 mm to 2.0 mm, in particular in a range of between 0.1 mm and 1.0 mm. In order to provide a structure for a connection of the spring element with the motor carrier, the sheet metal material has at least one connection area where the sheet metal material is folded such that two layers of sheet metal material are arranged vis-à-vis. A slot is provided in each of the layers such that the two slots are aligned (i.e. are at least partially congruent or overlapping in position and/or shape), and a connection extension of the spring element can be slid into the aligned slots in order to connect the spring element with the motor carrier. The spring element may comprise a motor connection portion by which the spring element is mounted at the movable motor part. The movable motor part may be connected at the motor carrier by means of at least two spring elements. The movable motor part may be mounted for linear vibratory motion, in particular for linear vibratory motion along an axis perpendicular to the extension plane of the spring element at rest. The motor may comprise more than one movable motor part.

The spring element may in particular be realized by a flat spring made from spring sheet metal, which shall not exclude that two or more layers of spring sheet metal are connected with each other to form the spring element.

One of the two layers of the connection area of the sheet metal material of the motor carrier may be closer (i.e. proximal) to the spring element and the other layer may then be farther away from (i.e. distal to) the spring element. In such embodiments, it is referred to the proximal layer and the distal layer of the folded connection area formed from the sheet metal material. It is contemplated that the slot in the proximal layer may at least in one region be smaller in width than the slot in the distal layer, in particular where the slot in the proximal layer may be smaller in width than the slot in the distal layer along its complete clamping length, i.e. the length that will get into contact with the connection extension of the spring element. In some embodiments, the slots each have a constant width and the width of the slot of the proximal layer is smaller than the width of the slot in the distal layer. In particular, the width of the slot in the proximal layer may be dimensioned so that a press fit between the connection extension of the spring element and the slot is established. And the slot in the distal layer may have a width dimensioned so that a transition fit is established between the connection extension of the spring element and the slot. The aligned slots may have a common opening at the folding edge, where the common opening may allow to slide an extension portion of the spring element into the pair of aligned slots. In some embodiments the common opening at the folding edge may comprise a chamfer that widens towards the folding edge to support sliding-in of the connection extension of the spring element into the aligned slots (e.g. in an automated process). The slot in the proximal layer may also have an opening in an edge opposite to the folding edge.

A gap may extend between the two vis-à-vis arranged layers of sheet metal material of the connection area, which gap may have a width in the range of between 0.005 mm to 5.0 mm, in particular in the range of between 0.01 mm to 2.0 mm and further in particular in the range of between 0.05 mm and 1.0 mm. This shall not exclude that in some embodiments the two layers abut against each other without any intentional gap.

The connection extension of the spring element may be held by clamping forces (i.e. friction forces) in the aligned slots. But the connection extension may in particular be fixedly secured at the sheet metal material, e.g. by means of welding or other connection technologies such as gluing, even though welding may be preferred for some motor applications. The fixation may be provided at the distal layer or at both layers. While it is contemplated that a gap may extend between the two layers of sheet metal material of the connection area, in some embodiments the two layers abut against each other and no intentional gap extends between the two layers. In particular in the latter case, the depth of the fixation (e.g. the welding depth) may extend from the distal layer through to the proximal layer.

The motor as proposed herein may be used in a personal care device, e.g. in an electric toothbrush, where the motor may be used for driving a drive shaft of the electric toothbrush.

Figure 1:
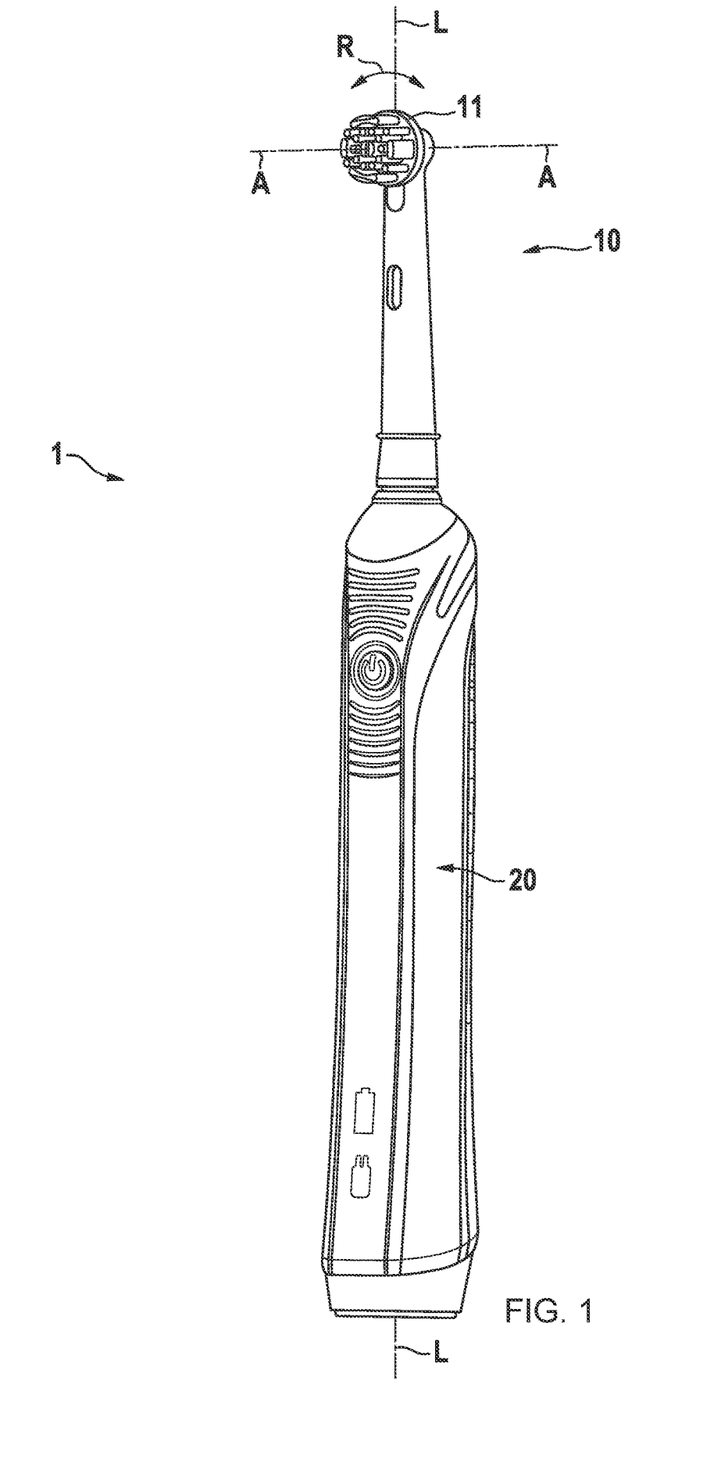
FIG. 1 is a depiction of an example personal care device realized as an electric toothbrush.

FIG. 1 is an example depiction of a personal care device 1 that is here realized as an electrical toothbrush. The personal care device 1 has a head section 10 and a handle section 20. In the shown example, the head section 10 is detachably attached to the handle section 20 so that the head section 10 can essentially not move with respect to the handle section 20. The head section 10 comprises a treatment head 11, here realized as a brush head. The treatment head 11 is arranged for driven oscillatory rotational motion around an axis A as indicated by double arrow R. The oscillatory rotational motion may be driven by a motor in accordance with the present description. The personal care device 1 extends along a longitudinal direction L.

Figure 2:
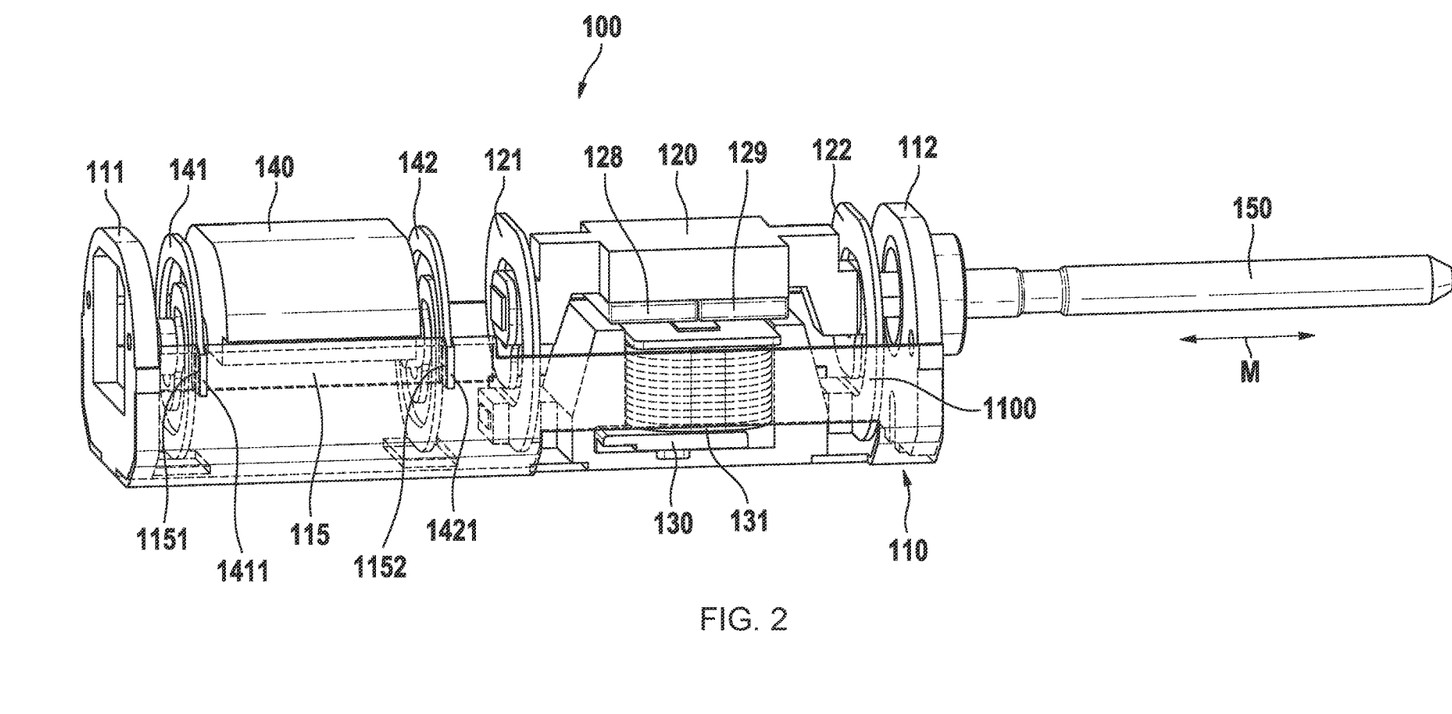
FIG. 2 is a depiction of an example motor in accordance with the present disclosure.

FIG. 2 is a depiction of an example motor 100 in accordance with the present description. The motor 100 as shown has two movable motor parts, namely an armature 120 and a counter-oscillating mass 140. The first movable motor part 120 is mounted at a motor carrier 110 by means of two spring elements 121 and 122. The second movable motor part 140 is mounted at the motor carrier 110 by means of two spring elements 141 and 142. It shall be understood that a motor as proposed only needs to have a single movable motor part and that a movable motor part can also be mounted at the motor carrier by means of a single spring element. It shall also be understood that the counter-oscillating mass 140, even so not actively driven into motion, but passively excited into a motion by the vibrations of the motor carrier 110, is a movable motor part within the meaning of the present application. It is here noted that the terms "first" and "second" with respect to the movable motor parts shall not convey any particular meaning other than to say that the shown example has two movable motor parts. In some embodiments, the armature may not be mounted as proposed herein, but only the counter-oscillating mass may be respectively mounted. Then the counter-oscillating mass would the first (or only) movable motor part that is mounted in a manner as described herein. This may also be true the other way around.

Figure 3:
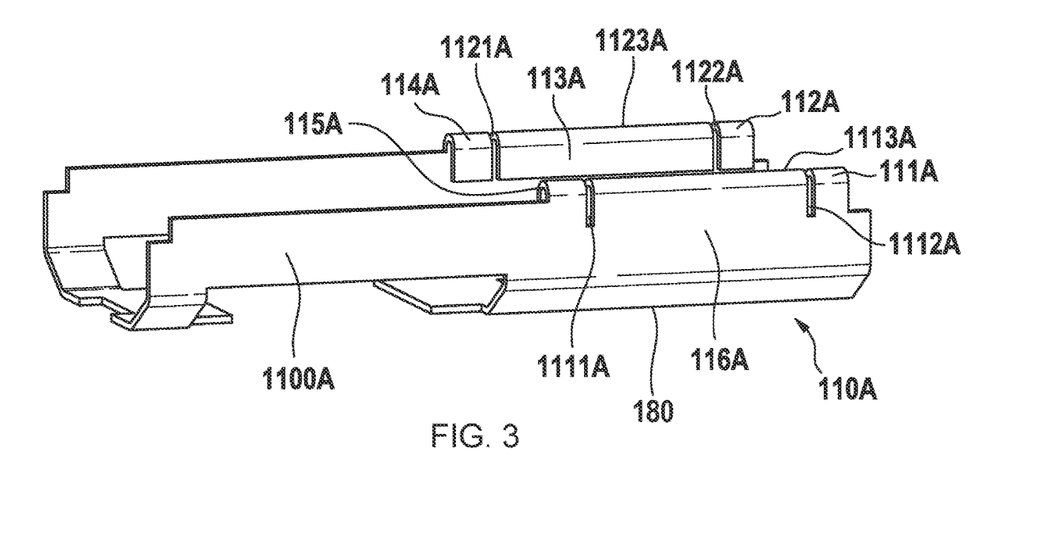
FIG. 3 is a depiction of an example motor carrier in accordance with the present disclosure.

The motor carrier 110 is made from a sheet metal material 1100 that may have been stamped and bent (laser cutting or similar techniques may be used as well instead of stamping). FIG. 3 shows an example motor carrier 110A made from stamped (or laser cut) and bent sheet metal material. Two stabilization elements 111 and 112 are fixedly secured at two opposing longitudinal ends of the motor carrier 110. A drive shaft 150 is attached to the armature or first movable motor part 120. A stator 130 comprises a coil 131 at which an alternating current is applied in operation so that the armature 120 that carries here two permanent magnets 128 and 129 is driven into a linear vibratory motion as indicated by double arrow M. The concept of a driven spring-mass type of motor that is excited at a drive frequency close to or at the resonance frequency of the spring-mass component is widely known by a person skilled in the art and is not further elaborated here.

In the shown example motor 100, the second movable motor part 140 is mounted at the motor carrier by means of the two spring elements 141 and 142, where the spring elements 141 and 142 each have a connection extension 1411 and 1421, respectively. The connection extension 1411 of spring element 141 extends into aligned slots 1151 of a folded connection area 115 of the sheet metal material 1100 of the motor carrier 110. The connection extension 1421 of spring element 142 extends into aligned slots 1152 of the folded connection area 115. In the folded connection area 115, two layers of the sheet metal material 1100 are arranged vis-à-vis so that a strong and good coupling between spring element and motor carrier is enabled as will be explained in more detail further below.

FIG. 3 is a depiction of an example motor carrier 110A made from stamped and bent sheet metal material 1100A. The motor carrier 110A has two oppositely arranged connection areas 111A and 112A, where the sheet metal material 1100A is folded so that two layers of sheet metal material are arranged vis-à-vis and in close juxtaposition to one another. The connection areas 111A and 112A are geometrically identical but are mirrored and a folded portion of the sheet metal material 1100A is in both cases folded inwards of the motor carrier 110A. Similar to FIG. 2, a spring element will in an assembled state extend in between the two coupling areas 111A and 112A. Each of the coupling areas 111A and 112A has a layer of sheet metal material that faces inwards and thus will be proximate to the spring element, which are proximal layers 113A and 115A. Similarly, each coupling area 111A and 112A has also an outer layer of sheet metal material 1100A, which will be distal to the spring element and are thus the distal layers 114A and 116A. The proximal and distal layers 113A and 114A are connected by folding edge 1123A and the proximal and distal layers 115A and 116A are connected by folding edge 1113A. Each of the folding edges 1113A and 1123A extends in a direction substantially parallel to the direction of the linear oscillatory motion "M" (FIG. 2) of the movable motor part 120. The proximal and distal layers of the sheet metal material extend from the corresponding folding edge and are mutually juxtaposed in close proximity to one another. The connection area 111A comprises two pairs of aligned slots 1111A and 1112A and the connection area 112A comprises two pairs of aligned slots 1121A and 1122A. The mutually aligned slots are aligned with one another in a direction substantially perpendicular to the direction of the linear oscillatory motion ("M") of the movable motor part 120. Each of the aligned pairs of slots 1121A and 1122A have a joint or common opening at the respective folding edge as is visible from FIG. 3.

Figure 4A:
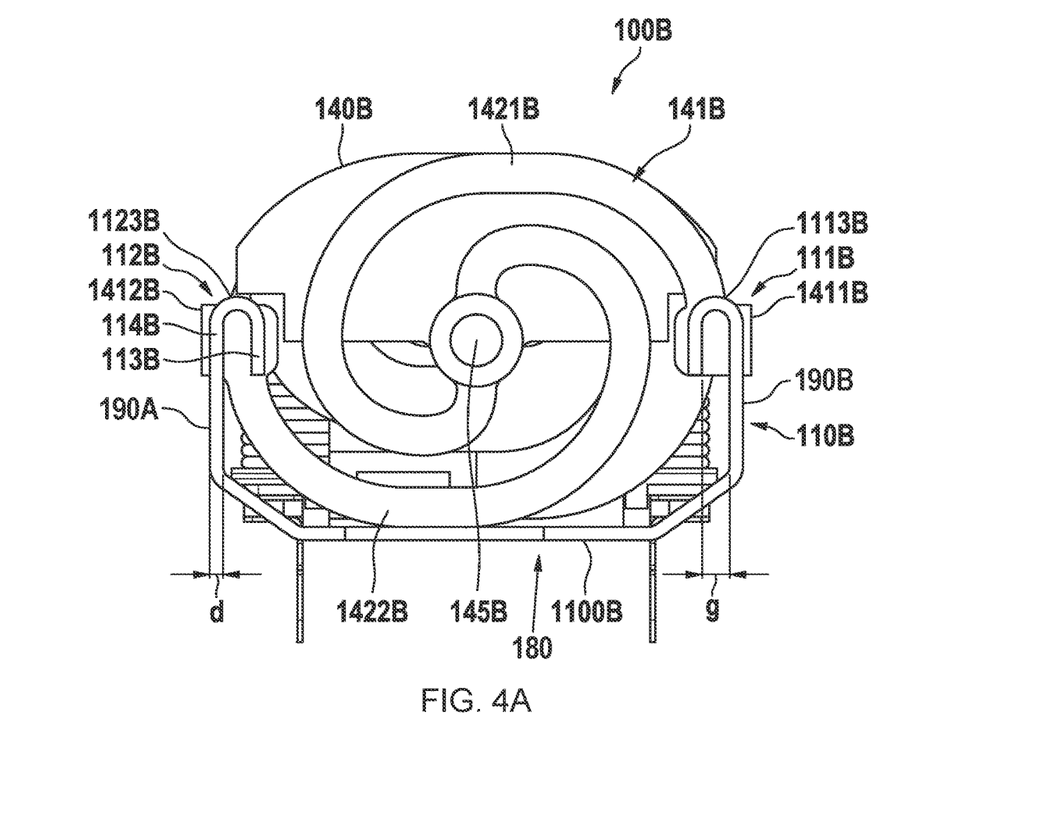
FIG. 4A is a front view onto a first embodiment of a spring-mounted moving motor part, where extension projections of a spring element are arranged in aligned slots of folded sheet metal connection portions.

FIG. 4A is a front view onto a first example embodiment of a motor 100B as proposed herein, the motor 100B having a movable motor part 140B that is mounted at a motor carrier 110B by means of a spring element 141B. A second spring element may be connected at the opposite end of movable motor part 140B. Like what was explained for the motor carrier 110A shown in FIG. 3, the motor carrier 110B has two connection areas 111B and 112B. Each connection area 111B and 112B comprises two layers of sheet metal material 1100B. The sheet metal material 1100B has here a thickness d that may lie in the previously mentioned ranges, in particular the thickness may be d=0.15 mm. The connection area 111B comprises a proximal layer 115B and a distal layer 115B that are connected by a folding edge 1113B. The two layers 115B and 116B are arranged at a distance that has a width g, which may be in the previously mentioned ranges, in particular the width may be g=0.5 mm. The same holds for the opposite connection area 112B having two layers 113B and 114B that are connected by a folding edge 1123B of the sheet metal material 1100B. Again, the gap between the proximal layer 113B and the distal layer 114B may be g=0.5 mm, but this shall not exclude that the two gaps have different values.

The spring element 141B, which is here realized as a flat spring at rest, has two spring arms 1421B and 1422B that extend from a central connection portion 145B at which the movable motor part 140B is connected with the spring element 141B. Each of the spring arms 1421B and 1422B turn around the center connection portion 145B by an amount of about 270 degrees. Each of the spring arms 1421B and 1422B ends in a connection extension 1411B and 1412B, respectively, which are arranged in aligned slots in the connection areas 111B and 112B, respectively. The connection extension of the spring element extends through its respective aligned slots in the direction substantially perpendicular to the direction of the linear oscillatory motion ("M") of the movable motor part 120. The motor carrier 110B may have the form and shape of the motor carrier 110A as shown in FIG. 3.

Figure 4B:
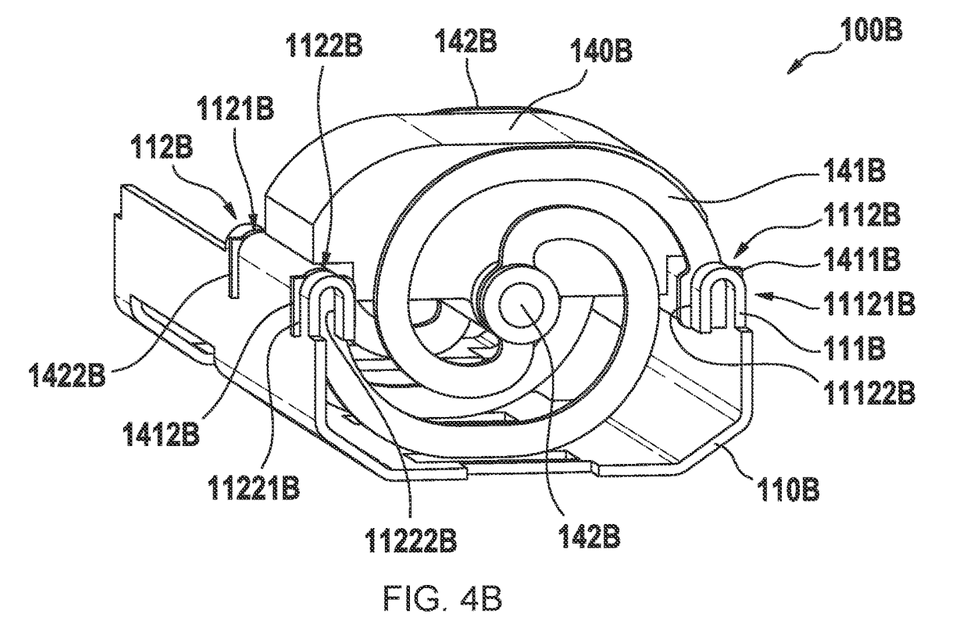
FIG. 4B is a perspective depiction of FIG. 4A.

FIG. 4B is a perspective view onto the first example motor 100B. In this view another spring element 142B is used to connect the moving motor part 140B at the motor carrier 110B. Each of the connection areas 111B and 112B comprises here two pairs of aligned slots of which aligned slots 1112B, 1121B, and 1122B are visible. The aligned pair of slots 1112B in connection area 111B comprises slots 11121B and 11122B that are arranged in the distal and the proximal layer of the connection area 111B, respectively. The aligned pair of slots 1122B in connection area 112B comprises slots 11221B and 11222B that are arranged in the distal and the proximal layer of the connection area 112B, respectively. Connection extension 1411B of the spring element 141B is disposed in the aligned pair of slots 1112B and connection extension 1412B of the spring element 141B is disposed in aligned pair of slots 1122B. It can also be seen that a connection extension 1422B of the other spring element 142B is disposed in the aligned pair of slots 1121B.

Figure 5A:
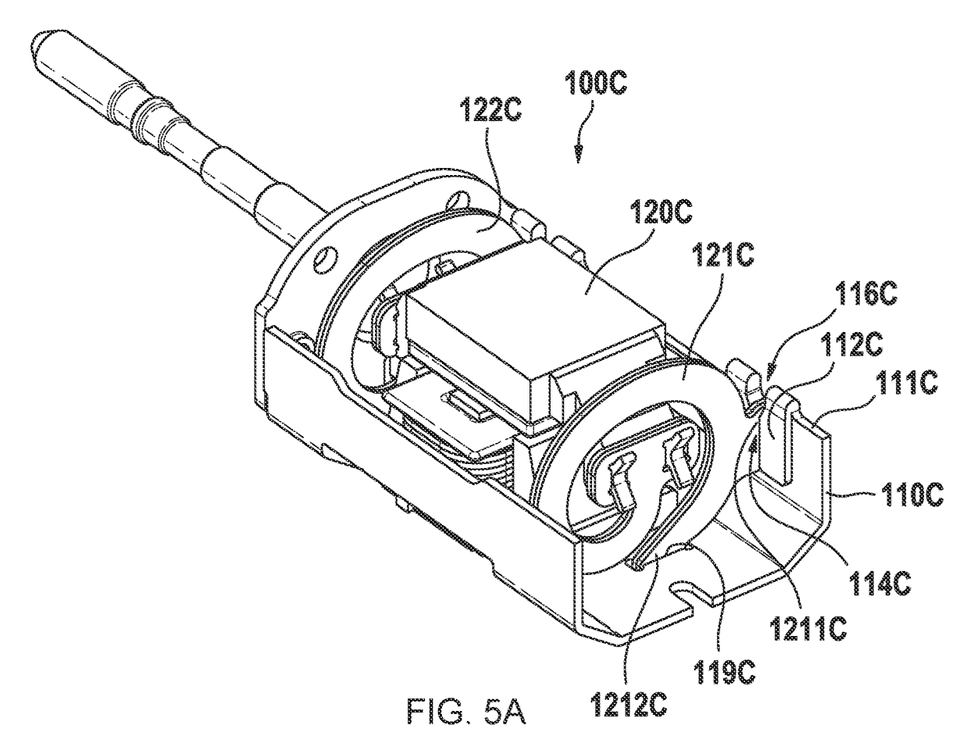
FIG. 5A is a perspective depiction of a moving motor part in accordance with a second embodiment.
Figure 5B:
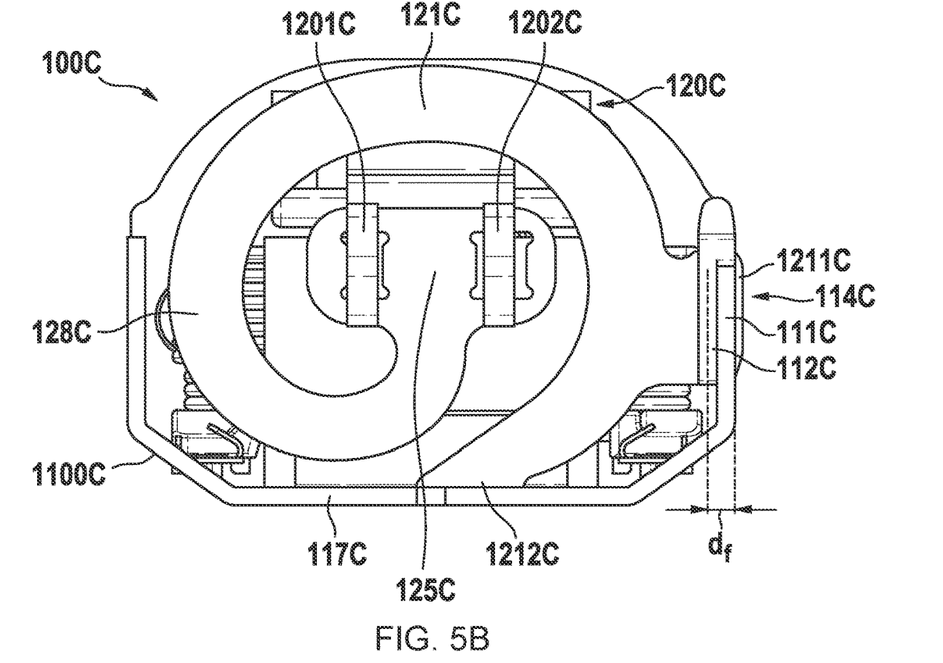
FIG. 5B is a front view of FIG. 5A.

FIGS. 5A and 5B are a perspective of and a front view onto a second example embodiment of a motor 100C in accordance with the present disclosure. A movable motor part 120C is mounted at a motor carrier 110C by means of spring elements 121C and 122C. Only spring element 121C will be further discussed in detail. Spring element 122C is mounted in a similar manner. In some embodiments, the first example embodiment and the second example embodiment have a joint motor carrier, i.e. the carriers 110B and 110C are joined to a single carrier so that a motor similar with the motor 100 shown in FIG. 2 results.

Spring element 121C has a single spring arm 128C that has a central connection portion 125C where the spring element 121C is fixed at the movable motor part 120C by means of splayed extensions 1201C and 1202C. The spring arms 128C turns around the center connection portion by about 360 degrees. A first connection extension 1211C connects the spring arm 128C at about 270 degree at a connection area 114C of the motor carrier 110C. A second connection extension 1212C of the spring arm is arranged at about 360 degrees and connects the spring arm 121C with a bottom layer 117C of the motor carrier 110C. The connection extension 1212C may by welded into a slot 119C provided in the bottom layer 117C. The connection area 114C comprises two layers of sheet metal material 1100C, namely a distal layer 111C and a proximal layer 112C, where the two layers 111C and 112C are arranged to abut against each other so that no gap extends between the two layers 111C and 112C. The two layers comprise a pair of aligned slots 116C. The structure of the connection area 114C is in a more general manner explained with reference to FIG. 6 further below and it is referred to this part of the description.

One difference between the first example embodiment of FIGS. 4A and 4B and the second example embodiment shown in FIGS. 5A and 5B is that in the second example embodiment the two layers 111C and 112C of sheet metal material 1100C are arranged without a gap. In such an embodiment, the fixation of the connection extension 1211C at the distal layer 111C by, e.g., welding may lead to a fixation depth that extends beyond the thickness of the distal layer 111C. As indicated in FIG. 5B, the fixation depth $d_f$ may extend through to the proximal layer and is then thicker than the thickness d of the sheet metal material 1100C (where the thickness d is defined with reference to FIG. 4A).

It is a common aspect of the shown embodiments and of the proposed motor in general that the fixation (e.g. welding) of the connection extension of the spring element at the motor carrier is done at the distal layer, where the width of the slot is somewhat wider than the width of the slot in the proximal layer. Independent from the precise realization, such a design tends to improve the fatigue limit of the fixation, i.e. the amplitude of cyclic stress that be applied to the connection without causing fatigue failure. The clamping at two layers leads to essentially a 2-point suspension, where the proximal clamping tends to suppress torsion stress on the welding seam at the distal layer. The folded connection area overall increases the stiffness of the motor carrier and thus tends to suppress vibrations and associated noise. Also, as becomes obvious, the number of needed components is low. No additional rivets are needed. In a motor as shown, the amplitude of movement in the longitudinal direction may be in the order of ±1.0 mm at a frequency of about 150 Hz. The chosen design also assures a relatively stiff fixation, which tends to ensure that the effective spring length (i.e. the spring constant) is relative precisely defined. As was already mentioned, the chamfered joint opening of the aligned slots facilitates the sliding of the connection extension into the aligned slots, hence it facilitates automatic assembly.

Figure 6:
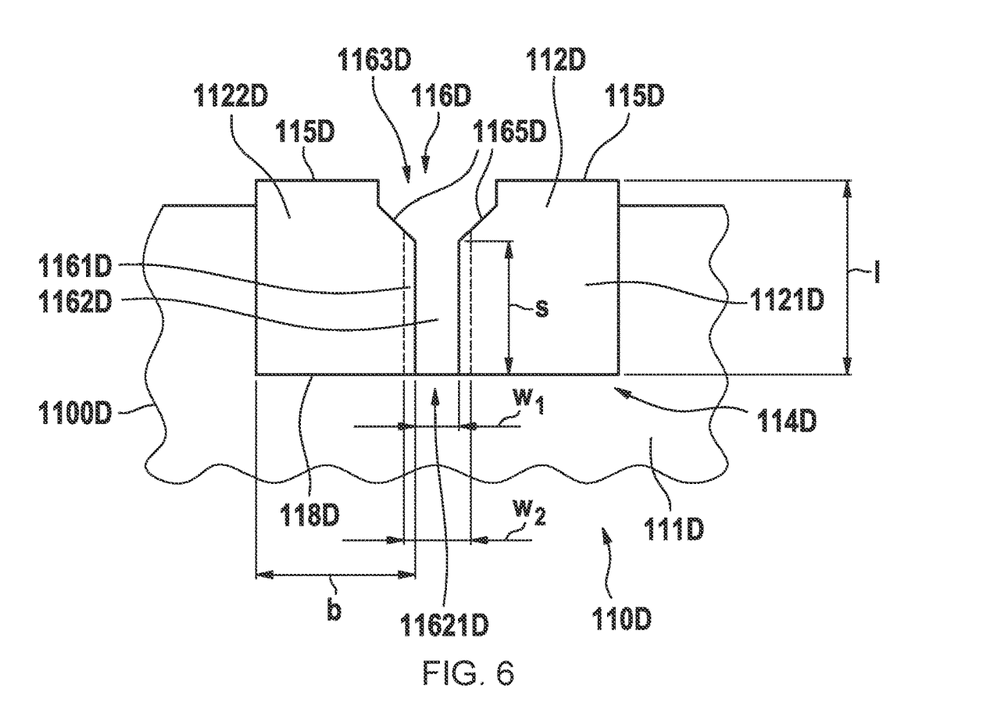
FIG. 6 is a depiction of an example motor carrier made from sheet metal material that comprises an example connection area.

FIG. 6 is a detail depiction of a portion of a motor carrier 110D made from sheet metal material 1100D that comprises an example connection area 114D. The connection area 114D comprises two layers 111D and 112D of sheet metal material 1100D. For sake of continuity, the layer 111D is here referred as the distal layer and the layer 112D is referred to as the proximal layer. A folding edge 115D of the motor carrier 110D connects the distal and proximal layers 111D and 112D. An aligned pair of slots 116D is provided in the connection area 114D. The aligned pair of slots 116D comprises a slot 1161D in the distal layer 111D and a slot 1162D in the proximate layer 112D. The aligned pair of slots 116D has a joint opening at the folding edge 115D. At the level of the folding edge 115D, the joint opening 1163D is larger in width than each of the slots 1161D and 1162D. The joint opening 1163D comprises a chamfer 1165D so that sliding of a connection extension of a spring element into the pair of aligned slots 116D is facilitated. The slot 1161D in the distal layer 111D has a width $w_2$ that is larger than the width $w_1$ of the slot 1162D in the proximal layer 112D. The effective clamping length of the pair of aligned slots 116D is s. The slot 1162D in the proximal layer 112D has also an opening 11621D at a free edge 118D of the proximate layer 112D, which free layer 118D lies opposite the folding edge 115D. As was mentioned proximal before, the width $w_2$ of the slot 1162D may be dimensioned so that a press fit with a connection extension of a spring element is established. In the shown design, the slot 1162D has a somewhat larger elasticity to deform under applied forces than a shaft/bore pair for which a press fit is usually defined—this shall not limit the definition of a press fit under the given circumstances, i.e. the mentioned dimensions are treated as if they relate to a shaft and a bore that shall establish a press fit. The width $w_1$ of the slot 1161D is dimensioned so that a transition fit is realized with respect to the connection extension of the spring element. By the given design the proximal layer 112D separates into two wings 1121D and 1122D that are arranged at the sides of the slot 1162D. The width of the wings 1121D and 1122D may be identical and may be given by b, where b may be in a range of between 1.0 mm and 50.0 mm. The height of the wings between folding edge 115D and free edge 118D is given by 1, where 1 may be in a range of between 1.0 mm and 30.0 mm. The given ranges shall not be understood as limiting. Other dimensions may be chosen as well in accordance with the needs of the individual case.

As best shown in FIGS. 2-4B, an embodiment of the motor carrier 110 for the linear motor 100 of the present disclosure comprises at least two spring elements 121, 122 that couple the movable motor part 120 with the motor carrier 110, each of the at least two spring elements 121, 122 having at least two connection extensions 1411B, 1412B. In the embodiment illustrated, the at least two connection extensions 1411B, 1412B are disposed opposite one another (FIG. 4A). In another embodiment, illustrated in FIGS. 5A and 5B, the at least two connection extensions 1211C, 1212C, are disposed otherwise.

The sheet metal material 1100B comprises at least two coupling areas 111A, 112A. Each of the at least two coupling areas 111A, 112A, which may be disposed opposite one another and at opposite sides of the movable motor part 120, comprises the sheet metal material 1100 folded to form a folding edge 1113B, 1123B extending in a direction substantially parallel to a direction of the linear oscillatory motion "M" (FIG. 2) of the movable motor part 120 and the two layers of the sheet metal material are folded to extend from the folding edge 1113B, 1123B to face each other in a close parallel juxtaposition with one another. The at least two layers comprise a proximal layer 113B, 115B that is proximate to the spring element 121, 122 and a distal layer 114B, 116B that is distant to the spring element 121, 122 (FIG. 4A). The proximal layer 113B, 115B includes a proximal slot and the distal layer includes a distal slot, the proximal and distal slots being aligned with one another in a direction substantially perpendicular to the direction of the linear oscillatory motion "M" of the movable motor part 120. Each of the connection extensions 1411B, 1412B of each of the at least two spring elements 121, 122 extends through the aligned proximal and distal slots in the direction substantially perpendicular to the direction of the linear oscillatory motion "M" of the movable motor part 120.

As best shown in FIG. 4A, the embodiment of the motor carrier 110 comprises a bottom portion 180 and two mutually opposite side walls 190A, 190B. Each of the side walls 190A, 190B extends from the bottom portion 180 up and terminates with the respective folding edge 1113B, 1123B. As is best shown in FIGS. 3 and 4A, the proximal layers 113A, 115A (FIG. 3) and 113B, 115B (FIG. 4A) may extends from the respective folding edge 1123A, 1113A (FIG. 3) and 1123B, 1113B (FIG. 4A) towards the bottom portion 180 and terminate before reaching the bottom portion 180. The aligned proximal and distal slots may extend from the folding edge 1113A, 1123A, 1113B, 1123B so that the aligned slots have a common opening at the respective folding edge.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A motor comprising:
a motor carrier made at least partially from a sheet metal material;
a movable motor part arranged for a linear oscillatory motion; and
a spring element that couples the movable motor part with the motor carrier, the spring element having a connection extension,
wherein the sheet metal material comprises at least one coupling area where the sheet metal material is folded to form a folding edge extending in a direction substantially parallel to a direction of the linear oscillatory motion of the movable motor part and two layers of sheet metal material extending from the folding edge and facing each other, the two layers comprising a proximal layer that is proximate to the spring element and a distal layer that is distant to the spring element, wherein each of the layers comprises a slot, the slots being aligned with one another in a direction substantially perpendicular to the direction of the linear oscillatory motion of the movable motor part, and wherein the connection extension of the spring element extends through the aligned slots in the direction substantially perpendicular to the direction of the linear oscillatory motion of the movable motor part.

2. The motor of claim 1, wherein the slot in the proximal layer is at least in one area smaller in width than the slot in the distal layer.

3. The motor of claim 1, wherein the aligned slots extend from the folding edge of the sheet metal material so that the slots have a joint opening at the folding edge.

4. The motor of claim 3, wherein the joint opening of the aligned slots comprises a widening chamfer.

5. The motor of claim 1, wherein the connection extension of the spring element is fixedly secured at least at the distal layer.

6. The motor of claim 5, wherein a depth of the the fixedly secured connection extension of the spring element extends through to the proximal layer.

7. The motor of claim 5, wherein the connection extension of the spring element is secured by welding.

8. The motor of claim 1, wherein there is a gap having a width of between 0.005 mm and 5.0 mm extending between the two layers of sheet metal material.

9. The motor of claim 1, wherein the proximal layer has a length of between 1.0 mm and 10.0 mm measured from the folding edge to a free edge of the layer.

10. The motor of claim 1, wherein the sheet metal material has a thickness of between 0.05 mm and 2.0 mm in at least the area of the layers facing each other.

11. The motor of claim 1, wherein the spring element is a leaf spring that in rest extends in a plane perpendicular to an extension plane of the two layers facing each other.

12. The motor of claim 1, wherein the slot in the proximal layer has a width set to provide a press fit between the connection extension of the spring element and the slot in the proximal layer, and the slot in the distal layer has a width set to provide a transition fit between the extension connection and the slot in the distal layer.

13. The motor of claim 1, wherein the slot in the proximal layer has an opening at an edge of the sheet metal material opposite to the folding edge.

14. A personal-care device comprising the motor of claim 1.

15. The personal-care device of claim 14, wherein the personal-care device is an electric toothbrush.

16. The motor of claim 1, wherein the proximal layer has a width of between 1.0 mm and 5.0 mm measured from the slot to a free side edge of the layer.

17. A linear motor comprising:
a motor carrier made at least partially from a sheet metal material;
a movable motor part arranged for a linear oscillatory motion; and
at least two spring elements that couple the movable motor part with the motor carrier, each of the at least two spring elements having at least two connection extensions,
wherein the sheet metal material comprises at least two coupling areas, each of the at least two coupling areas comprising the sheet metal material folded to form a folding edge extending in a direction substantially parallel to a direction of the linear oscillatory motion of the movable motor part,
wherein the two layers of the sheet metal material extend from the folding edge to face each other in a close parallel juxtaposition with one another, the at least two layers comprising a proximal layer that is proximate to the spring element and a distal layer that is distant to the spring element,
wherein the proximal layer includes a proximal slot and the distal layer includes a distal slot, the proximal and distal slots being aligned with one another in a direction substantially perpendicular to the direction of the linear oscillatory motion of the movable motor part, and
wherein each of the connection extensions of each of the at least two spring elements extends through the aligned proximal and distal slots in the direction substantially perpendicular to the direction of the linear oscillatory motion of the movable motor part.

18. The linear motor of claim 17, wherein the motor carrier comprises a bottom portion and two mutually opposite side walls, each of the side walls extending from the bottom portion up and terminating with the folding edge.

19. The linear motor of claim 18, wherein proximal layer extends from the folding edge towards the bottom portion and terminates before reaching the bottom portion.

20. The linear motor of claim 17, wherein the aligned proximal and distal slots extend from the folding edge so that the slots have a common opening at the folding edge.

21. The linear motor of claim 17, wherein the proximal slot is at least partially wider than the distal slot aligned therewith.

22. The linear motor of claim 17, wherein the at least two coupling areas are disposed opposite one another and at opposite sides of the movable motor part.

* * * * *